(12) United States Patent
Saleem et al.

(10) Patent No.: US 8,599,747 B1
(45) Date of Patent: Dec. 3, 2013

(54) LAWFUL INTERCEPTION OF REAL TIME PACKET DATA

(75) Inventors: Adnan Saleem, Surrey (CA); Neil Gunn, Coquitlam (CA); Yong Xin, Coquitlam (CA); Jagtar Gill, Surrey (CA); Alvin Chubbs, Vancouver (CA)

(73) Assignee: Radisys Canada Inc., Burnaby (CA)

( * ) Notice: Subject to any disclaimer, the term of this patent is extended or adjusted under 35 U.S.C. 154(b) by 1419 days.

(21) Appl. No.: 11/961,645

(22) Filed: Dec. 20, 2007

Related U.S. Application Data

(60) Provisional application No. 60/870,981, filed on Dec. 20, 2006.

(51) Int. Cl.
*G06F 15/16* (2006.01)
*H04B 7/212* (2006.01)

(52) U.S. Cl.
USPC ........ 370/321; 370/235; 370/356; 379/93.09; 709/203; 709/231; 709/235

(58) Field of Classification Search
USPC ........ 455/453; 379/93.09; 709/203, 218, 231, 709/235, 249; 370/235, 321, 355, 356
See application file for complete search history.

(56) References Cited

U.S. PATENT DOCUMENTS

| | | | |
|---|---|---|---|
| 6,282,193 B1 * | 8/2001 | Hluchyj et al. | 370/356 |
| 6,381,220 B1 * | 4/2002 | Kung et al. | 370/250 |
| 6,661,886 B1 * | 12/2003 | Huart et al. | 379/215.01 |
| 6,678,267 B1 * | 1/2004 | Anandakumar et al. | 370/356 |
| 6,711,689 B2 * | 3/2004 | Lumme et al. | 726/22 |
| 6,731,625 B1 * | 5/2004 | Eastep et al. | 370/352 |
| 6,959,346 B2 * | 10/2005 | Low et al. | 710/50 |
| 6,963,739 B2 * | 11/2005 | Dorenbosch et al. | 455/406 |
| 6,996,094 B2 * | 2/2006 | Cave et al. | 370/356 |
| 7,027,398 B2 * | 4/2006 | Fang | 370/235 |
| 7,042,888 B2 * | 5/2006 | Berggreen | 370/401 |
| 7,061,901 B1 * | 6/2006 | Shnitzer et al. | 370/352 |
| 7,092,493 B2 * | 8/2006 | Hou et al. | 379/35 |
| 7,124,195 B2 * | 10/2006 | Roach et al. | 709/232 |
| 7,161,939 B2 * | 1/2007 | Israel et al. | 370/389 |
| 7,283,521 B1 * | 10/2007 | Ryan | 370/389 |
| 7,302,702 B2 * | 11/2007 | Hippelainen | 726/13 |
| 7,310,334 B1 * | 12/2007 | FitzGerald et al. | 370/389 |
| 7,330,900 B2 * | 2/2008 | Burger et al. | 709/231 |
| 7,336,944 B2 * | 2/2008 | Sand et al. | 455/414.4 |
| 7,382,735 B2 * | 6/2008 | Chong | 370/252 |
| 7,382,881 B2 * | 6/2008 | Uusitalo et al. | 380/262 |
| 7,447,909 B2 * | 11/2008 | Reith | 713/183 |
| 7,496,086 B2 * | 2/2009 | Eckberg | 370/352 |
| 7,525,922 B2 * | 4/2009 | Cidon et al. | 370/242 |
| 7,545,803 B2 * | 6/2009 | Halbraich | 370/356 |
| 7,546,376 B2 * | 6/2009 | Widegren et al. | 709/232 |

(Continued)

OTHER PUBLICATIONS

Baker, F. et al. "Cisco Architecture for Lawful Intercept in IP Networks," RFC 3924, Oct. 2004.*

(Continued)

*Primary Examiner* — Melvin H Pollack
(74) *Attorney, Agent, or Firm* — Stoel Rives LLP

(57) ABSTRACT

A method of conducting a lawful intercept of real time media packet traffic involves redirecting real time media packet streams between a caller and callee through a media server; replicating the media packet streams within the media server; modifying packet headers of the replicated packet streams; and directing the modified packet streams to at least one monitoring port.

22 Claims, 3 Drawing Sheets

(56) References Cited

U.S. PATENT DOCUMENTS

| | | | |
|---|---|---|---|
| 7,548,539 B2 * | 6/2009 | Kouretas et al. | 370/356 |
| 7,564,840 B2 * | 7/2009 | Elliott et al. | 370/356 |
| 7,577,422 B2 * | 8/2009 | Laiho et al. | 455/410 |
| 7,583,897 B2 * | 9/2009 | Farmer et al. | 398/72 |
| 7,587,757 B2 * | 9/2009 | Scoggins et al. | 726/11 |
| 7,620,389 B2 * | 11/2009 | Kallio et al. | 455/414.1 |
| 7,626,980 B1 * | 12/2009 | Croak et al. | 370/352 |
| 7,676,025 B2 * | 3/2010 | Lautenschlager et al. | 379/35 |
| 7,688,820 B2 * | 3/2010 | Forte et al. | 370/389 |
| 7,693,062 B2 * | 4/2010 | Perkins et al. | 370/235 |
| 7,706,359 B2 * | 4/2010 | Pounds et al. | 370/353 |
| 7,809,827 B1 * | 10/2010 | Apte et al. | 709/224 |
| 7,822,018 B2 * | 10/2010 | Williams et al. | 370/352 |
| 7,836,160 B2 * | 11/2010 | Baum | 709/223 |
| 7,843,902 B2 * | 11/2010 | Imbimbo et al. | 370/352 |
| 7,873,035 B2 * | 1/2011 | Kouretas et al. | 370/356 |
| 7,894,356 B2 * | 2/2011 | Mottishaw et al. | 370/252 |
| 7,899,178 B2 * | 3/2011 | Williams et al. | 379/265.06 |
| 7,904,056 B2 * | 3/2011 | Speranza | 455/412.1 |
| 8,018,955 B2 * | 9/2011 | Agarwal et al. | 370/401 |
| 8,023,421 B2 * | 9/2011 | Lloyd et al. | 370/252 |
| 8,050,273 B2 * | 11/2011 | Gass | 370/395.2 |
| 8,059,634 B1 * | 11/2011 | Evans | 370/356 |
| 8,059,790 B1 * | 11/2011 | Paterik et al. | 379/88.02 |
| 8,265,077 B2 * | 9/2012 | Imbimbo et al. | 370/392 |
| 8,400,927 B2 * | 3/2013 | Attanasio et al. | 370/241 |
| 8,509,095 B2 * | 8/2013 | Ormazabal | 370/242 |
| 8,537,818 B1 * | 9/2013 | Thesayi et al. | 370/389 |
| 2003/0179747 A1 * | 9/2003 | Pyke et al. | 370/389 |
| 2003/0235184 A1 * | 12/2003 | Dorenbosch et al. | 370/352 |
| 2004/0202295 A1 * | 10/2004 | Shen et al. | 379/112.01 |
| 2005/0094651 A1 * | 5/2005 | Lutz et al. | 370/401 |
| 2005/0175156 A1 * | 8/2005 | Afshar et al. | 379/35 |
| 2005/0286466 A1 * | 12/2005 | Tagg et al. | 370/329 |
| 2006/0198504 A1 * | 9/2006 | Shemisa et al. | 379/201.02 |
| 2006/0268847 A1 * | 11/2006 | Halbraich et al. | 370/352 |
| 2006/0268921 A1 * | 11/2006 | Ekstrom et al. | 370/437 |
| 2007/0121596 A1 * | 5/2007 | Kurapati et al. | 370/356 |
| 2007/0143858 A1 * | 6/2007 | Hearty | 726/27 |
| 2007/0153776 A1 * | 7/2007 | Joseph et al. | 370/356 |
| 2007/0297418 A1 * | 12/2007 | Lee | 370/395.52 |
| 2007/0297578 A1 * | 12/2007 | Blair et al. | 379/67.1 |
| 2008/0072307 A1 * | 3/2008 | Maes | 726/12 |
| 2008/0080685 A1 * | 4/2008 | Barnes et al. | 379/112.05 |
| 2008/0155310 A1 * | 6/2008 | Langen et al. | 714/6 |
| 2009/0135814 A1 * | 5/2009 | Kreusch et al. | 370/389 |
| 2009/0252151 A1 * | 10/2009 | Rappe | 370/352 |
| 2010/0118859 A1 * | 5/2010 | Williams et al. | 370/352 |
| 2013/0229950 A1 * | 9/2013 | Bjorsell et al. | 370/259 |

OTHER PUBLICATIONS

Branch, P. et al. "Using MAC Addresses in the Lawful Interception of IP Traffic," Australian Telecommunications Network & Applications Conference (ATNAC), Dec. 8-10, 2004, pp. 449-452.*

Xenakis, C. and Merakos, L. "On Demand Network Wide VPN Deployment in GPRS," IEEE Network, vol. 16, Issue 6, Nov./Dec. 2002, pp. 28-37.*

Zander, S. et al. "Automated Traffic Classification and Application Identification Using Machine Learning," IEEE Conference on Local Computer Networks, 30th Anniversary, Nov. 17, 2005, pp. 250-257.*

* cited by examiner

LAWFUL INTERCEPTION OF REAL TIME PACKET DATA

CROSS REFERENCE TO RELATED APPLICATION

This application claims the benefit under 35 USC 119(e) of U.S. provisional application No. 60/870,981 filed Dec. 20, 2006, the contents of which are herein incorporated by reference.

FIELD OF THE INVENTION

This invention relates to a method and apparatus for the lawful interception of real time packet data transported over a network, such as the Internet. The invention also has application to other applications requiring minimal latency.

BACKGROUND OF THE INVENTION

Real time data carrying multimedia applications, such as voice or video, is transmitted over the Internet using the Real Time Protocol (RTP). VoIP (Voice over IP) is becoming increasingly popular to the consternation of law enforcement agencies that have legitimate needs to tap into calls for law enforcement purposes. For regulatory law enforcement reasons, a call between two parties may have been authorized, through proper law enforcement procedure, to be monitored by selected law enforcement agencies.

A conventional telephone conversation involves the establishment of a physical connection between the calling and called parties. While this physical connection might merely be a channel within a time division multiplexed system, it nevertheless is dedicated to the parties during the call and this makes it relatively easy for the law enforcement agencies to tap into the call. On the other hand, VoIP, for example, which involves the use of packets individually routed between the parties, is much more difficult to intercept, especially without alerting the parties to the presence of the intercept. Typically attempts at processing the packets to extract the data will introduce latency that is observed by the parties as unusual delay, thus alerting them to the possibility of an intercept. Similar problems arise with other types of multimedia streams.

An object of the invention is to provide a method and apparatus for intercepting real time packet traffic that has a low probability of alerting the participants to the intercept.

SUMMARY OF THE INVENTION

In accordance with embodiments of the invention, an incoming real time data traffic stream is replicated to outgoing stream on a media server in a low latency fashion. By definition a media server is a device that stores and shares media. The media server can typically be a Radisys media server of the type described in U.S. Pat. No. 7,124,163, the contents of which are herein incorporated by reference. One such suitable server is the Convedia CMS-9000 Media Server.

The ability to replicate and replicate an incoming RTP stream to an outgoing stream is important to enable service providers to support Lawful Intercept services, as well as additional services, such as, Push-to-Talk/PoC or Operator Line Monitoring applications.

In accordance with an embodiment of the invention, packets are replicated through the system with minimal latency and no media processing is applied to those packets. For certain applications, packets can be replicated through the Media Server in as little as 20 ms.

For other applications, delays may be larger depending on the latency and architectural requirements demanded by the feature.

Thus, according to the present invention there is provided a method of conducting a lawful intercept of real time media packet traffic, comprising directing real time media packet streams between a caller and callee through a media server; replicating the media packet streams within the media server; modifying packet headers of the replicated packet streams; and directing the modified packet streams to at least one monitoring port.

Although the invention is primarily concerned with lawful intercepts, there are a number of applications, which may make use of an RTP Replicate feature. The feature allows RTP packets coming in to the media server to be replicated from one user to many users in a group context. From an applications perspective, the RTP replicate feature has many useful applications including: Lawful Intercept; Push to Talk/PoC; Operator Line Monitoring; and Secure RTP In one embodiment, an RTP replicate group is created to allow for the called and callee parties RTP packets to be replicated and replicated to n number of law enforcement agencies in a low latency fashion. The latency requirements for law enforcement action particularly require a low latency delay between the caller and callee parties to ensure undetectability and hence this feature is ideal for these applications. Numerous law enforcement agencies may become part of the RTP replicate group that is set up on a per call basis.

The invention also provides a gateway for permitting the lawful interception of real time media packet traffic, comprising a first port for connection to a caller; a second port for connection to a callee; a processor for forwarding packets between the caller and callee, said processor also replicating said packets; and at least one port for supplying replicated packet streams to at least one monitoring port.

BRIEF DESCRIPTION OF THE DRAWINGS

The invention will be described in more detail, by way of example only, with reference to the accompanying drawings, in which: —

DETAILED DESCRIPTION OF THE PREFERRED EMBODIMENTS

Figure 1:
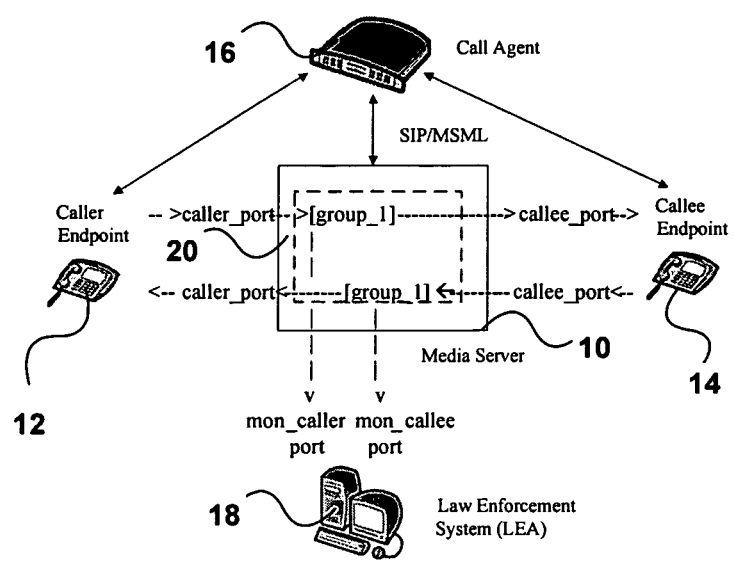
FIG. 1 is a diagram illustrating a system for the lawful interception of real time data using a media server.

FIG. 1 shows a system representing an embodiment of the invention. During a typical intercept operation, media server 10, which can be of the type referred to above, connects caller 12 with callee 14 under the control of call agent 16. In IP telephony, a call agent typically controls connection services for a media gateway and/or native IP endpoints, selects processes that can be applied to a call, provides routing for a call within the network based on signaling and customer database information, transfers control of the call to another network element, and interfaces to and supports management functions such as provisioning, fault, billing, etc. Law enforcement agency 18 intercepts the calls by accessing the media server 10.

The media server 10 includes at least one digital processor 20 for forwarding the packets between the caller and callee. In accordance with the principles of the inventor, the digital processor also replicates the packets and forwards them to the law enforcement agency 18 for monitoring as described in more detail below.

In conventional operation of the media server referred to, real time RTP (Real Time Transport) media is extracted from the incoming packets and inserted into a jitter buffer where it is reordered and de-jittered before processing occurs. Processing may involve decoding, mixing, encoding, or inter-DSP communications. Finally, the processed data is placed into new RTP packets for output. The jitter buffer, inter-DSP communication and compressed codecs all produce additive communication delay.

In accordance with embodiments of the invention, the media server is inserted between the caller and callee to intercept the RTP streams. RTP replication is used to monitor a call in progress without the replicated packets passing through the jitter buffer. The Media Server can replicate and replicate this traffic to n Law Enforcement Agencies (LEAs). In one embodiment, the interface between the Call Agent and the media server is SIP/MSML (Session Initiation Protocol/Media Sessions Markup Language).

Four ports are created on the media server with the desired send/receive capabilities. The four ports are connected respectively to the Caller, the party that initiated the call; the Callee, the party who is called by the Caller; Mon-Caller, the lawful intercept recipient for media from the caller to the callee (in this case there is only 1 Mon-Caller); and Mon-Callee, the lawful intercept recipient for media from the callee to the caller The definitions above refer to a four port system, however, RTP can be distributed to multiple (n) Law Enforcement Agency (LEAs) systems directly from the Media Server or via an intermediate vendor specific Lawful Intercept Gateway (LIG). In some cases, it may be more efficient to use a Lawful Intercept Gateway (LIG) to manage and redistribute the RTP to many LEAs than to do it directly from multiple Media Servers in the network.

In the described embodiment, these four roles are used as the instance part of a MSML connection identifier in the MSML commands described below. An actual exemplary implementation would use the media server local tag from the 200 Response to the SIP INVITE that established the connection.

The caller and callee each hear each other and each of their media is sent out to the respective monitoring connection.

As noted above, the media server 10, acting as an Intermediate Gateway, is not injected into regular calls between the Caller party and the Callee party, which are controlled by the Call agent in a conventional manner. When it is desired to intercept the RTP of either Caller or Callee, the media server resources shown are inserted into the RTP stream as illustrated. Three joins are used to connect Caller and Callee bi-directionally, replicate the incoming RTP of Caller (which is also the outgoing RTP to the Callee) and send it to Mon-Caller Port, and replicate the incoming RTP of Callee (which is also the outgoing RTP to the Caller) and send it to Mon-Callee Port.

The RTP streams to LEA Ports are regular bidirectional RTP streams, but normally there will be no audio on them incoming to the media server. If for some reason audio is received, the unidirectional joins will ensure that it is ignored.

In the absence of interception, the RTP/UDP streams Caller and Callee are directly connected together and no phone tapping or interception would exist. The Media Server is not involved in this two party call.

In the event that Caller has been designated as a tapped endpoint, the Call Agent redirects the call through an Intermediate Gateway device, which in this system architecture is a Convedia Media Server. The purpose of the Intermediate Gateway device is to intercept and replicate the RTP of either Caller or Callee.

The interface from the Media Server to the LEAs comprises two unidirectional RTP/UDP streams, one for each direction of audio through the Intermediate Gateway, Caller and Callee.

The RTP streams forwarded from the Intermediate Gateway to the LEA System or LIG have no special format or encapsulation. G.711 is the only codec initially used for all RTP streams.

It is possible to replicate of only audio streams if desired. If the ports are initially created as multi-media, the RTP-replicate function can still be supported; however, only the audio streams are replicated.

It is also possible to replicate Out of band DTMF signals. If tel-events are negotiated on the initial call setup (between caller and callee), then the replicate ports also replicate out-of-band DTMF.

Both Mon-Caller and Mon-Callee output streams from the Media Server to the LEA system are sent to a single UDP port, and the LEA system distinguishes them by local descriptors, namely each IP_address and UDP Port_Number used at the MS (media server) side.

It is possible for both parties to be intercepted at the same time. In the event that both Caller and Callee are being intercepted, two Intermediate Gateways are inserted into the RTP stream. This is true whether the originating and terminating parties are controlled by one Call Agent or two Call Agents.

The RTP packets must normally be replicated in 20 ms to ensure undetectability of the Lawful Intercept feature (ports must be on the same DSP, no inter-DSP traffic allowed). The exception to this is that additional delay on the LEA monitor ports is permitted because this is not observable to the caller or callee.

The Low latency solution thus produces a latency delay across the media server for the caller and callee of a maximum of 20 ms so that the intercept is undetectable over the cumulative end-to-end network budget delay.

To ensure minimum latency, all the connections of the four parties should be located on the same Digital Signal Processor (DSP).

Preferably, all connections related to the single lawful intercept operation are defined within a unique group, e.g.: "group=gId". In this embodiment, SIP INVITE requests must indicate the same group identifier for each connection so that the media server can co-locate connections in the same group on the same DSP. The media server will reserve sufficient resources for the entire RTP-replicate group when the first connection identifying the group is made. This reservation will ensure that the lawful intercept call can be established.

The syntax of the new RTP-replicate group is modeled on the "conf" context, for setting up a conference call, but the context will support MSML. An example is: INVITE sip:group=group1@ms.example.com;ports=n;collocate= ["true"|"false"]

Providing such a new group service context is preferable to adding parameters to an existing "MSML" context; intermediate proxies can route this properly.

The MSML using personalized mixing can be as follows. All of this can be done in a single MSML request in one INFO message or each action could be a separate request in its own INFO message.

The following is an exemplary MSML v1.1 script to implement this function.

```
<!-- join the caller monitor to receive media from the
  caller -->
  <join id1="conn:caller" id2="conn:mon-caller">
    <stream media="audio" dir="from-id1"/>
  </join>
<!-- join the callee monitor to receive media from the
  callee -->
  <join id1="conn:callee" id2="conn:mon-callee">
    <stream media="audio" dir="from-id1"/>
  </join>
<!-- join the caller to the callee bi-directionally -->
  <join id1="conn:caller" id2="conn:callee">
    <stream media="audio"/>
  </join>
```

The following is an exemplary MSML v1.0 script.

```
<!-- join the caller monitor to receive media from the
  caller -->
  <join id1="$mon_caller_IP:UDP" id2="$caller_IP:UDP" duplex="half">
  </join>
<!-- join the callee monitor to receive media from the
  callee -->
  <join id1="$mon_callee_IP:UDP" id2="$callee_IP:UDP" duplex="half">>
  </join>
<!-- join the caller to the callee bi-directionally -->
  <join id1="$caller_IP:UDP" id2="$callee_IP:UDP">
  </join>
```

An exemplary SIP call flow for the entire operation would be as follows:

Media Server—Internal Connection Setup Diagram (Phase II)

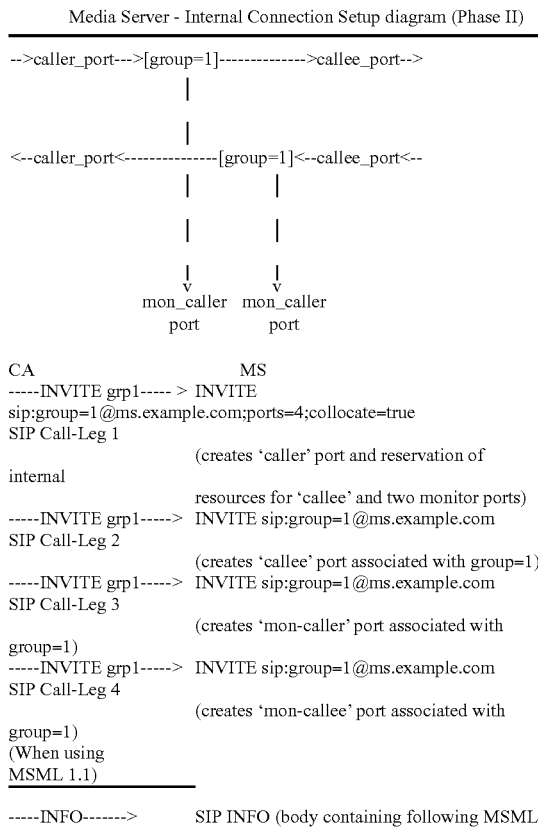

| Media Server - Internal Connection Setup diagram (Phase II) | |
|---|---|
| -->caller_port--->[group=1]-------------->callee_port--> | |
| <--caller_port<---------------[group=1]<--callee_port<-- | |
|         v      v<br>   mon_caller  mon_caller<br>    port        port | |
| CA | MS |
| -----INVITE grp1-----> | INVITE sip:group=1@ms.example.com;ports=4;collocate=true |
| SIP Call-Leg 1 | |
| | (creates 'caller' port and reservation of internal resources for 'callee' and two monitor ports) |
| -----INVITE grp1-----> | INVITE sip:group=1@ms.example.com |
| SIP Call-Leg 2 | |
| | (creates 'callee' port associated with group=1) |
| -----INVITE grp1-----> | INVITE sip:group=1@ms.example.com |
| SIP Call-Leg 3 | |
| | (creates 'mon-caller' port associated with group=1) |
| -----INVITE grp1-----> | INVITE sip:group=1@ms.example.com |
| SIP Call-Leg 4 | |
| | (creates 'mon-callee' port associated with group=1) |
| (When using MSML 1.1) | |
| -----INFO-------> | SIP INFO (body containing following MSML 1.1) |
| INFO over SIP Call-Leg 1 | <join id1="$caller_tag" id2="$mon-caller_tag"><br>  <stream media="audio" dir="from-id1"/><br></join> |
| -----INFO-------> | SIP INFO (body containing following MSML 1.1) |
| INFO over SIP Call-Leg 1 | <join id1="$callee_tag" id2="$mon-callee_tag"><br>  <stream media="audio" dir="from-id1"/><br></join> |
| -----INFO-------> | SIP INFO (body containing following MSML 1.1) |
| INFO over SIP Call-Leg 1 | <join id1="$caller_tag" id2="$callee_tag"><br>  <stream media="audio"/><br></join> |
| (When using MSML 1.0) | |
| -----INFO-------> | SIP INFO (body containing following MSML 1.0) |
| INFO over SIP Call-Leg 1 | <join id1="$mon-caller_tag" id2="$caller_tag" duplex="half"><br></join> |
| -----INFO------> | SIP INFO (body containing following MSML 1.0) |
| INFO over SIP Call-Leg 1 | <join id1="$mon-callee_tag" id2="$callee_tag" duplex="half"><br></join> |
| -----INFO-----> | SIP INFO (body containing following MSML 1.0) |
| INFO over SIP Call-Leg 1 | <join id1="$caller_tag" id2="$callee_tag"><br></join> |

Two separate examples are show above, one using MSML 1.1 specification and the second using MSML 1.0. The SIP INVITES described earlier are common to either MSML specification. Three SIP INFO/MSML requests above can be sent over three separate INFO requests (as shown above), or all of the above MSML requests could be combined and sent within a single INFO message over any SIP Call-Leg) $caller_tag, $callee_tag, $mon-caller_tag, and $mon-callee_tag are specified differently between MSML 1.0 and MSM 1.1 specifications.

In MSML 1.0 the $_tags are defined as "$IP_addr:$UDP_port"

In MSML 1.1 the $_tags are defined as "conn:$to_tag", as returned by Media Server in 200 OK response to the SIP INV request.

The RTP-replicate function processes packets in a different way from regular media processing functions to allow the media server to deliver a 20 ms delay across the system.

The RTP Replicate function bypasses the jitter buffer and all the other processing steps, which introduce delay, and changes the MAC and IP addresses, port numbers of the incoming RTP packets to create outgoing RTP packets. Everything else is left intact. All incoming payload types are replicated without change including telephone events, audio, and comfort noise. In this design, there is no need to resequence and dejitter the packets since the original sequence numbers and timestamps are left in the stream. These streams are replicated to the LEA system as the Mon-Caller and Mon-Callee ports.

In this design, all RTP replicate resources are located on a single DSP using the RTP-replicate group service context. On a single DSP, the maximum delay through the media server will meet the 20 ms delay as incoming packets and outgoing packets each can consume up to 10 ms each giving a total of 20 ms maximum delay. The requirement for 20 ms delay is only between the caller and the callee so the monitor ports can be replicated to a different DSP if there is no room for collocation.

ICMP processing for RTP Replicated ports is handled in a similar way to normal ports. The reception of an ICMP Destination Unreachable on a port causes RTP Replicating for that port to be suspended for the specified OAMP ICMP Timeout time. Further ICMP packets cause the ICMP Timeout time to double until the number of ICMP packets reaches the specified OAMP ICMP Tries value at which time all RTP replicating is permanently stopped to that port. This whole process is reset if no ICMP messages are received within the specified OAMP ICMP Reset time.

Packet modifications are made to the incoming packet and to the outgoing RTP packet as set forth in the following table:

| Header | Specific Fields | Modification Notes |
|---|---|---|
| Ethernet | Destination Address | Change to MAC address of negotiated destination port. |
| | Source Address | Change to MS MAC address |
| | Protocol Type | Unchanged |
| IP | Version | Unchanged |
| | Header Length | Unchanged |
| | Type of Service | Unchanged |
| | Total Length | Unchanged |
| | Identifier | Unchanged |
| | Fragmentation Flags | Unchanged |
| | Fragment Offset | Unchanged |
| | Time to Live | Unchanged |
| | Protocol | Unchanged |
| | Header Checksum | Recomputed for IP address changes. Note that the media server assumes that the incoming checksum is valid so bad checksums on the input will result in bad checksums on the output. |
| | Source IP Address | Change to MS IP address |
| | Destination IP Address | Change to negotiated destination IP address |
| | IP Options | Unchanged (If present) |
| UDP | Source Port | Change to MS source port |
| | Destination Port | Change to negotiated destination port |
| | Length | Unchanged |
| | Checksum | Recomputed for UDP port changes. Note that a zero checksum on the input indicates no checksum and is left as zero on the output. |
| RTP | Version | Unchanged |
| | Padding | Unchanged |
| | Extension | Unchanged |
| | CSCR Count | Unchanged |
| | Marker | Unchanged |
| | Payload Type | Unchanged (Could be changed in the future if required for a more generic RTP Replicate.) |
| | Sequence Number | Unchanged |
| | Time Stamp | Unchanged |
| | SSRC | Unchanged |
| | Optional CSRC List | Unchanged (If present) |
| | Optional Extension | Unchanged (if present) |
| Payload | Format Specific Headers | Unchanged (AMR, G.723, etc) |
| | Media | Unchanged |

Examples of suitable control protocols for setting up an intercept follow.

SIP INVITE ("Group" Service Context)

The RTP-Replicate feature is supported via SIP/MSML 1.0 and SIP/MSML 1.1.

Feature use is supported via a new service context, namely "group".

The "group" service context supports the following SIP URI parameters:

1. ports=p (where p is the number of parties in the replicate group). Valid values for p are 1 to 4. The ports parameter is optional, when not present, the default of 1 is used.
2. collocate=["true"|"false"] (When set to true, DSP/port resources are co-located on the same DSP, in order to minimize RTP packet latencies). When parameter is omitted, the default of 'false' is used.

The group SIP service context specifies the group Identifier to which all replicate services are associated.

The group identifier is defined as a string of maximum 96 token characters.
token=1*(alphanum/"−"/"."/"!"/"%"/"*"/"_"/"+"/"`"/"'"/"~")

The following is an example SIP INVITE request setting up the RTP replicate group. INVITE sip:group=reserve_123@ms.com;ports=4;collocate=true The above SIP Invite request performs the following actions: create group service context with identifier "reserve_123"; create SIP connection and associated media port; pre-reserve internal resources for 3 additional media ports (since ports=4); and ensure all resources associated with this service context are reserved to be co-located on same DSP (digital signal processor).

Since the group service context provides pre-reservation mechanism, SIP INVITEs to same group identifier shall be executed in sequence to ensure that reservation is complete prior to accepting and executing the requests based on the reserved resources. A group locking mechanism shall be implemented to ensure the sequential operations.

The URI encoded parameters associated with group context, namely "ports" and "collocate" adopt default values when not specified and the group context does not already exist. The ports attribute default shall be "1" and collocate attribute default shall be "false".

When the group service context already exists, then omission of ports and collocate attributes shall use the already defined values from previous INV request which initially created the group service context. If ports and collocate attributes are supplied and the group context already exists, then these parameters shall be validated to ensure they match the parameters already stored with the given group context.

The SIP INFO method is used to allow connections created as part of the replicate group to be joined via MSML <join> requests.

The SIP INFO method must be invoked on the SIP control channel associated with given group service context. Request to join connections together which belong to MSML context, or requests to join connections where one belongs to MSML context and the other to group context shall be rejected.

SIP-SDP/Media Negotiation

Call agent offers SDP (session description protocol).

This mechanism is the standard case where the SIP INVITE provides the offered SDP.

Media Server shall respond with the Answer SDP in the SIP 200 OK response. Once acknowledged by the CA, the Media Server shall create the media port based on the offer/answer negotiated port characteristics.

Resources for any additional media ports shall be reserved accordingly to match the media characteristics of this first port within the group. For the "group" context, which defines resources to be collocated on same DSP, encoder and decoder resources are not required and hence omitted.

Subsequent SIP INVITE request to create the actual media ports (for which the pre-reservation was made), shall be validated to ensure that the SDP media characteristics match the earlier reservation, including the same codec settings. Details of validation of additional parameters shall be determined during detailed design and implementation phase.

Media negotiation shall be limited to audio only for the group service context.

The SIP SDP Offer/Answer model requires the media to offer the SDP in response to a SIP INVITE with no SDP shall be supported.

There are two possibilities for consideration:
1/ First SIP INV which creates the group context
2/ Subsequent SIP INV requests which use the previously reserved ports In the first case, for "group" context proving RTP replication service, Media Server shall offer one or more audio codecs according to OAMP setting and therefore a final lockdown procedure is required. It is expected that Application server shall respond (in SDP answer) with the same codec for all ports belonging to the same replication group. Media Server shall reject SDP answers which do not match a previously selected codec within the same replication group.

In the second case, media server should offer the same codec information as negotiated for the first port within the group. This is to ensure that subsequent ports designated for the same group share common media parameters, in order to be able to correctly replicate RTP packets.

Mid-call codec changes are not supported for ports belonging to the same group context. However, mid-call changes shall support modification of far-end IP address, far-end UDP port number, and media direction (RTPmode).

SIP Early Media feature is not supported for RTP replicate applications. The early media feature is not compatible with this service, since media services such as announcements are not supported for ports belonging to group context.

RTP media shall begin to be replicated once the MSML <join> request between two given ports has been executed.

In order not to miss any packets between the Caller and the Callee, the application server shall ensure that connections from the Caller and Callee to mon-Caller and mon-Callee ports, respectively, have been established prior to joining the Caller/Callee ports.

Any ports belonging to the same group may be deleted as a result of receipt of ICMP messages. On such an occurrence, all other ports associated with the group continue to function according to their connection setup. However, the level of service may be affected as expected. For instance, if ICMP destination unreachable is received for the Caller port, then the mon-Caller port will not be receiving RTP stream from this connection.

NAT traversal functionality shall be supported for connections belonging to the group service context. IP address translation for the Caller and Callee ports is subject to NAT traversal, since port types of ports send RTP packets to the Media Server.

The mon-Caller and mon-Callee ports do not send RTP packets to the media server, and hence, NAT traversal is irrelevant for these ports.

Currently the MSML <join> request only supports joining connections to a conference. However, the ability to join two connections together shall be supported for the RTP Replicate feature.

Only connections created under the SIP group service context shall be allowed to be joined. Requests to join MSML connections to group connections and any other different types of connections shall be rejected.

SIP INFO messages carrying MSML requests shall be supported over SIP control channels created by either SIP INV sip:msml or SIP INV sip:group requests.

MSML requests to ports belonging to the group service context shall be limited to <join> only.

All other MSML or MOML (Modeling Markup Language) requests to ports belonging to group service context shall be rejected.

The SCRM API is modified to accommodate the following high level requirements.

1. Ability to pre-reserve port resources prior to port creation via SIP INV.
2. Ability to pre-reserve resources based on requests for full reservation (RTP-In, Encoder, Decoder, and RTP-Out) or on-demand reservation (RTP-In and RTP-Out only)
3. Ability co-locate media ports on the same DSP, when requested by protocol layers
4. Ability to join or connect media streams between ports.

Some SCRM API Changes are made. These are highlighted as follows.

1. Modify—Port Create API

Modify the existing Port_create command to include a co-location port id. Thus, the protocol will be able to create multiple ports in a single SCRM request and specify if they want some or all of the ports to be on the same DSP. A value of 0 for the tCollocatePortId parameter indicates no co-location is required with another port.

MpcCpSrm_CCmdPortCreate(
    MpcCpSrm_TPortId tPortId,
    MpcCpSrm_TUserParameter tUserParameter,
    MpcCpSrm_fnEventCallback fnIframeCallback,
    MpcCpSrm_TPortId tCollocatePortId,
    MpcCpSrm_EReservationType eReserveType);

2. Modify—Port Reserve Most Expensive API

Modify the existing Port_reserveMostExpensive command to also include a co-location port id. This will allow the same as above when the MS is offering the SDP.

MpcCpSrm_CCmdPortReserveMostExpensive(
    MpcCpSrm_TPortId tPortId,
    bool bOverrideRTPMode,
    MpcCpSrm_TUserParameter tUserParameter,
    MpcCpSrm_fnEventCallback fnIframeCallback,
    MpcCpSrm_TPortId tCollocatePortId,
    MpcCpSrm_EReservationType eReserveType);

3. New—Port Add Stream API

New command Port_addStream that will allow configuring a RTP relay from the source port to the destination port. The stream direction parameter will allow specifying whether its half duplex or full duplex.

MpcCpSrm_CCmdPortAddStream(
    MpcCpSrm_TPortId tSrcPortId,
    MpcCpSrm_TPortId tDestPortId,
    MpcCpSrm_EStreamDirection eStreamDir);

4. New—Port Remove Stream API

New command Port_removeStream that will allow disconnecting a RTP relay from the source port to the destination port. The stream direction parameter will allow specifying whether to remove the half or full duplex relay.

MpcCpSrm_CCmdPortRemoveStream(
    MpcCpSrm_TPortId tSrcPortId,
    MpcCpSrm_TPortId tDestPortId,
    MpcCpSrm_EStreamDirection eStreamDir);

New Reservation Type

New enumerated type (MpcCpSrm_EreservationType) shall support the following values:

EN_RESERVETYPE_FULL
    Shall result in creation of RTP-In, Encoder, Decoder, and RTP-Out This enumerated value shall be the default and existing protocols (MGCP) shall not be affected. In addition, existing SIP service context shall continue to use FULL reservation mechanism.

EN_RESERVETYPE_ONDEMAND

Shall result in creation of RTP-In and RTP-Out only.

This enumeration type shall only be used for the new SIP "group" service context.

Minstrel Manager

The Minstrel Manager supports the mechanism associated with servicing requests which require resources to be co-located on the same DSP. Minstrel Manager shall reject requests which cannot fulfill the co-location request. The Link Action parameter shall be expanded to include support for collocate to be specified as Mandatory or Optional.

The Minstrel Manager allows the creation of port resources based on FULL or ON-DEMAND reservation. When on-demand reservation is requested, only the minimum set of resources shall be reserved, namely RTP-In and RTP-Out (without un-necessary allocation of Encoder and Decoder resources). However, ability to subsequently modify (by adding or removing) resources shall be support for either type of reservation model.

Figure 2:
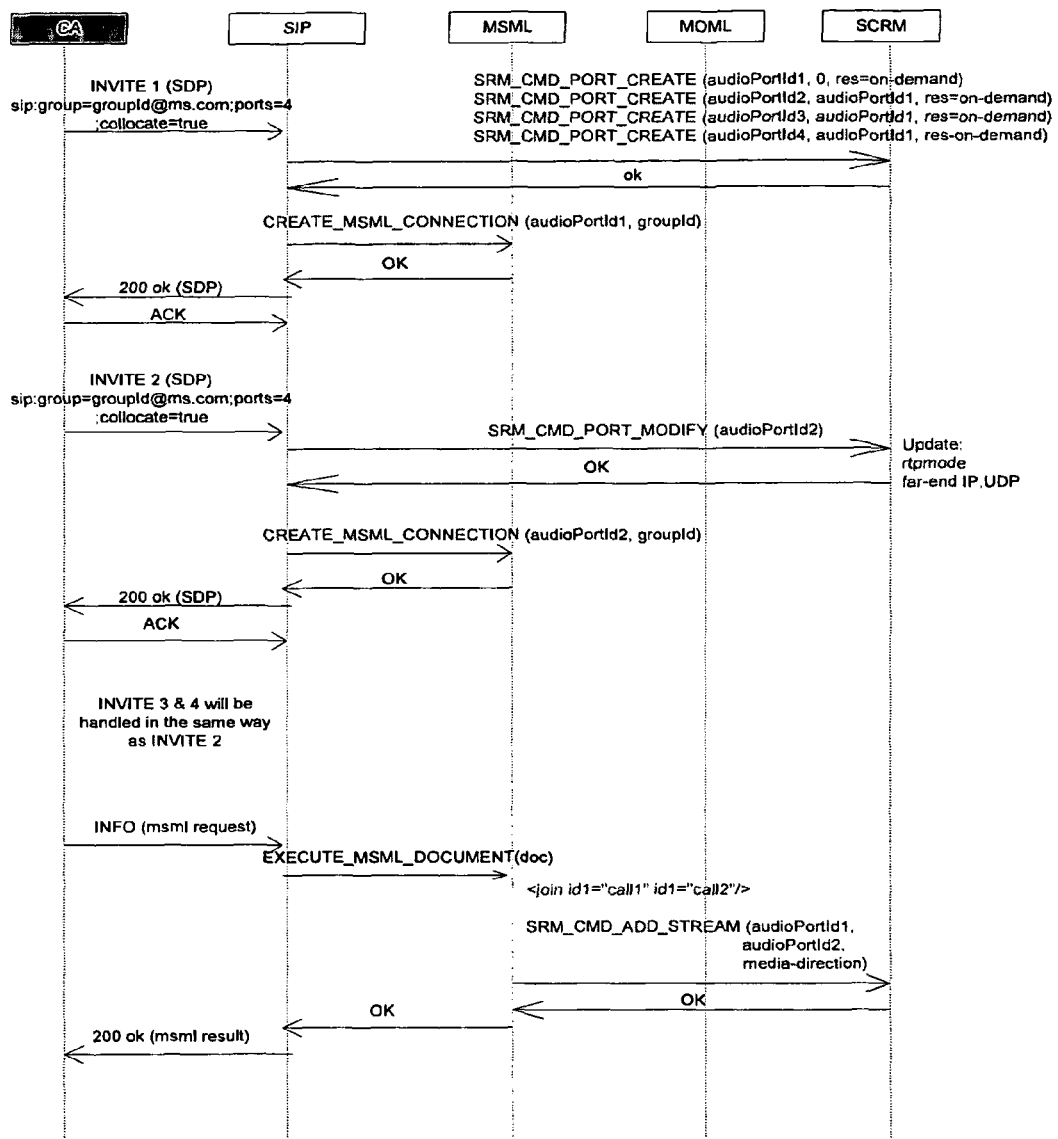
FIGS. 2 and 3 are transaction diagrams illustrating operation of the system.
Figure 3:
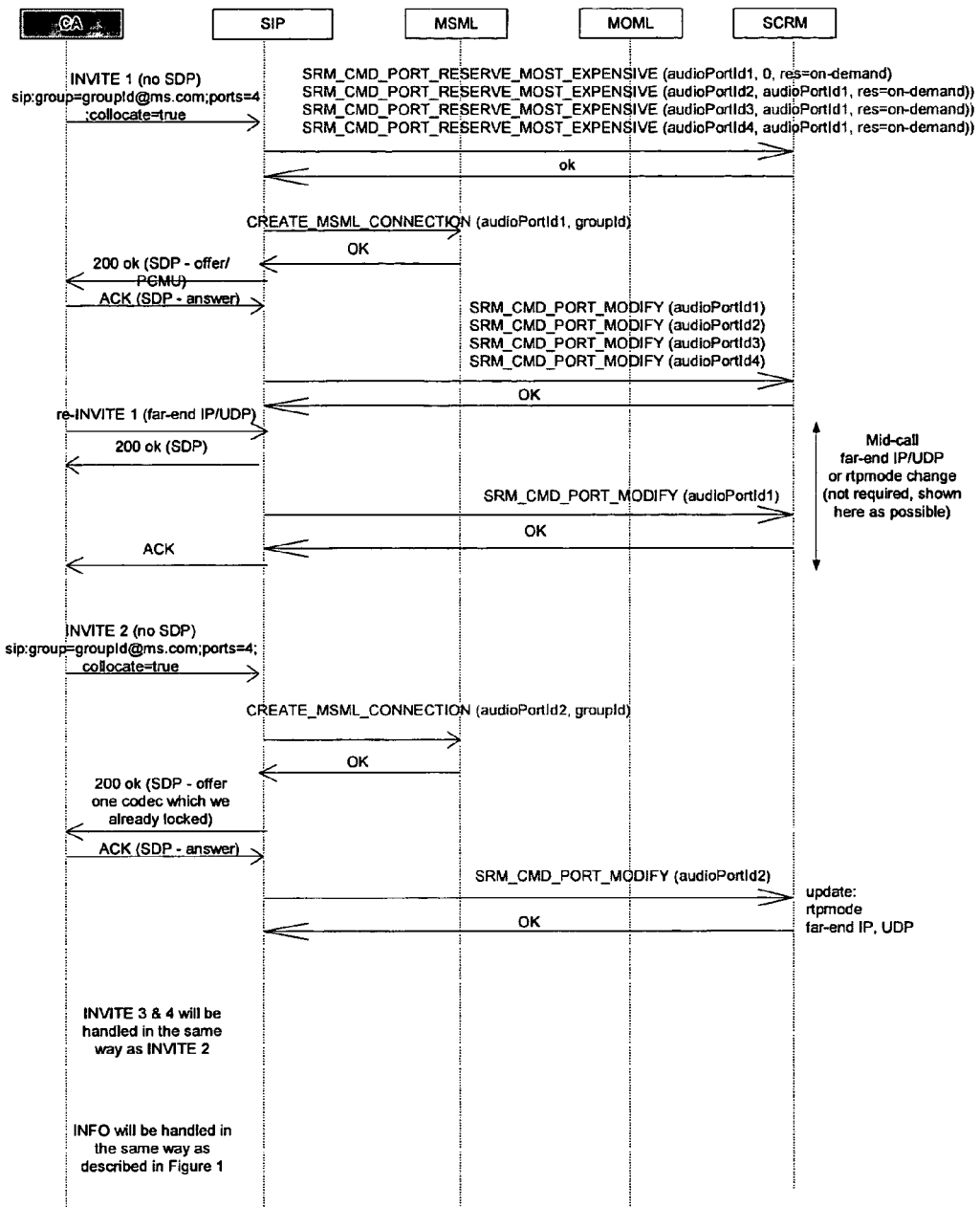

Detailed transaction diagrams illustrating the establishment of a call in accordance with an embodiment of the invention are shown in FIGS. 2 and 3.

In the example described, there are a total of four ports, one for the caller, one for the callee, a caller monitoring port, and a callee monitoring port. It will of course be understood by persons skilled in the art that the number of ports, in particular monitoring ports can be increased to permit multiple parties to monitor the call between the caller and callee.

We claim:

1. A method of conducting a lawful intercept of real time media packet traffic with low latency and detection avoidance, comprising:

directing real time media packet streams between a caller and callee through a media server, the media server being dedicated to the lawful intercept of real time media packet traffic;

replicating the media packet streams within the media server, the replication resulting in original media packet streams and replicated media packet streams;

forwarding, using the media server, the original media packet streams between the caller and the callee;

modifying address and port information in packet headers of the replicated packet streams, without encapsulating packets of the replicated packet streams or modifying payload data of the replicated packet streams so as to reduce latency and avoid detection, wherein the modifications comprise:

changing a source address to an address of the media server;

changing a source port to a source port of the media server;

changing a destination address to an address of a monitoring system; and changing a destination port to at least one monitoring port; and directing, based on the modified address and port information, the modified packet streams to the at least one monitoring port.

2. A method as claimed in claim 1, wherein a real time packet stream is established in each direction between the caller and callee, and replicated versions of said packet streams are directed to respective monitoring ports on the media server.

3. A method as claimed in claim 2, wherein the real time packet stream comprises RTP (realtime transport protocol) packets.

4. A method as claimed in claim 3, wherein the MAC, IP addresses, and port numbers of incoming RTP packets are modified to create outgoing RTP packets directed to said monitoring ports.

5. A method as claimed in claim 1, wherein the packets are forwarded and replicated within the media server on a common digital signal processor.

6. A method as claimed in claim 5, wherein the replicated packets are processed further on a separate digital signal processor.

7. A method as claimed in claim 1, wherein the call is established by means of a call agent, which routes a call subject to lawful intercept through the media server.

8. A method as claimed in claim 7, wherein in the absence of a lawful intercept said call agent handles said call without sending said packets through the media server, and in the presence of a lawful intercept said call agents redirects incoming packets from the caller through the media server.

9. A method as claimed in claim 7, wherein the call agent communicates with the media server using SIP/MSML protocol.

10. A method as claimed in claim 1, wherein the modified packet streams include sequence numbers and timestamps that are the same as original sequence numbers and timestamps in the original media packet streams, and wherein the step of replicating the media packet streams includes causing packets to by-pass de-jitter buffers and pass directly through the media server without further processing to modify the original sequence numbers and timestamps so as to maintain minimum delay passing through the media server.

11. A method as claimed in claim 1, further comprising creating a packet replicate group for the replicated packets, and assigning a group identifier to the replicate packet group.

12. A method as claimed in claim 11, wherein said packet replicate group includes a group service context specifying the number of parties in the replicate group, and a collate parameter for co-locating port resources on a common digital signal processor.

13. A method as claimed in claim 1, wherein said real time media packet traffic comprises a VoIP call.

14. A dedicated gateway for permitting the lawful interception of real time media packet traffic with low latency and detection avoidance, comprising:

a first port for connection to a caller;

a second port for connection to a callee;

a processor for forwarding packets between the caller and callee, said processor also replicating said packets; and at least one port for supplying replicated packet streams to at least one monitoring port, wherein the processor modifies, without encapsulating packets of the replicated packet streams or modifying payload data, address and port information in headers of the replicated packets to direct them to the at least one monitoring port.

15. A gateway as claimed in claim 14, further comprising a control port for communicating with a call agent establishing a call between the caller and callee.

16. A gateway as claimed in claim 15, wherein the media server is configured to communicate with the call agent using SIP/MSML protocol.

17. A gateway as claimed in claim 14, wherein the media server is configured to create a group service associated with a replicate group and to assign a group identifier to the group service.

18. A gateway as claimed in claim 17, wherein said group service includes a group service context specifying the number of parties in the replicate group, and a collate parameter for co-locating port resources on a common digital signal processor.

19. A communications system for permitting the lawful interception of real time media packet traffic with low latency and detection avoidance, comprising:
- a call agent for establishing a call between a caller and callee over a packet network; and
- a dedicated media server for processing real time media packets including a first port for connection to a caller, a second port of connection to a callee, a processor for forwarding packets between the caller and callee and replicating said packets, and at least one port for supplying replicated packet streams to at least one monitoring port, wherein said processor modifies source and destination address and port information in headers of the replicated packet streams, without encapsulating packets of the replicated packet streams, so as to direct the replicated packet streams to the at least one monitoring port, and wherein said call agent redirects said packets through said media server in the event of a lawful intercept request.

20. A communications system as claimed in claim 1, wherein the media server adds no more than 20 milliseconds delay to the packets forwarded between the caller and callee.

21. A communications system as claimed in claim 14, wherein the gateway adds no more than 20 milliseconds delay when forwarding packets between the caller and callee.

22. A communications system as claimed in claim 19, wherein the media server adds no more than 20 milliseconds delay to the packets forwarded between the caller and callee.

* * * * *